US006312082B1

(12) United States Patent
Lund et al.

(10) Patent No.: US 6,312,082 B1
(45) Date of Patent: Nov. 6, 2001

(54) CLEAR FLUID INK-JET PEN ALIGNMENT

(75) Inventors: Mark D. Lund; David Burton, both of Vancouver, WA (US); Steven B. Elgee, Portland, OR (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/379,521

(22) Filed: Aug. 23, 1999

(51) Int. Cl.[7] .......................... B41J 29/393; B41J 2/195; B41J 23/00; B41J 2/17; G01D 11/00

(52) U.S. Cl. .................................. 347/19; 347/7; 347/37; 347/96; 347/98; 347/100

(58) Field of Search ................................ 347/19, 37, 96, 347/7, 14, 12, 38, 39, 98, 100

(56) References Cited

U.S. PATENT DOCUMENTS

| | | | |
|---|---|---|---|
| 4,786,803 | 11/1988 | Majette et al. | 250/237 |
| 5,600,350 | 2/1997 | Cobbs et al. | 347/19 |
| 5,635,969 | 6/1997 | Allen | 347/96 |
| 5,796,414 | 8/1998 | Sievert et al. | 347/19 |

*Primary Examiner*—John Barlow
*Assistant Examiner*—Charles W. Stewart, Jr.

(57) ABSTRACT

A method and apparatus for a test pattern used in the alignment of an ink-jet pen which deposits fixer fluid, or other clear ink precursor fluid, on print media uses the change in reflectivity caused by overprinting a series of positional-calibration indicia with colorant to obtain data with respect to deviations in a carriage-scan x-axis and a paper scan y-axis. Thus the invention measures distances between pens or nozzles.

15 Claims, 3 Drawing Sheets

CLEAR FLUID INK-JET PEN ALIGNMENT

BACKGROUND OF THE INVENTION

1. Field of the Invention

The present invention relates generally to ink-jet printing technology methods and apparatus and, more specifically, to a method and apparatus for aligning ink-jet pens firing droplets of a clear fluid.

2. Description of the Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal,* Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions. Ink-jet devices are also described by W. J. Lloyd and H. T. Taub in *Output Hardcopy* [*sic*] *Devices,* chapter 13 (Ed. R. C. Durbeck and S. Sherr, Academic Press, San Diego, 1988).

In U.S. Pat. No. 5,635,969 (Allen, assigned to the common assignee of the present invention and incorporated herein by reference), METHOD AND APPARATUS FOR THE APPLICATION OF MULTIPART INK-JET INK CHEMISTRY, a multi-color ink-jet printing system includes a printing element for apply a precisely metered quantity of a colorless precursor to a recording medium surface. The precursor conditions the medium surface prior to application of one or more colorants to the recording medium surface to prevent cockle and curl and to reduce dry time, while conditioning the recording surface for uniform dot gain independent of media composition. U.S. patent application Ser. No. 09/069,717, entitled REACTIVE INK SET FOR INK-JET PRINTING, by Askeland et al., and U.S. patent application Ser. No. 09/069,616, entitled MULTI-CHAMBER FLUID SUPPLY, by Askeland et al., and Related Applications cited therein are also assigned to the common assignee of the present invention and are incorporated herein by reference. Hereinafter, clear fluids used to affect ink dry time and permanence and to prevent cockle and curl of the print medium are generically referred to as "fixers."

In U.S. Pat. No. 5,600,350 (Cobbs et al., assigned to the common assignee of the present invention and incorporated herein by reference), MULTIPLE INKJET PRINT CARTRIDGE ALIGNMENT BY SCANNING A REFERENCE PATTERN AND SAMPLING SAME WITH REFERENCE TO A POSITION ENCODER, a method and apparatus for multiple ink-jet print cartridge alignment is provided by scanning a reference pattern and sampling with an optical sensor. In effect, a given test pattern is printed and actual print image data is compared to determine any misregistration of the cartridges. A SYSTEM AND METHOD FOR ESTABLISHING POSITIONAL ACCURACY IN TWO DIMENSIONS BASED ON A SENSOR SCAN IN ONE DIMENSION, also to the common assignee herein and incorporated by reference, is provided in U.S. Pat. No. 5,796,414 (Sievert et al.).

While the method of printing a test pattern and optically detecting actual positions of element of the pattern on the print media provides a valuable tool for colorants that have a sufficient reflectivity difference with respect to the background media, a problem arises with colorants that have a reflectance only a few percent different than the reflectance of the blank media. In U.S. patent application Ser. No. 08/636,439, for SYSTEMS AND METHOD FOR DETERMINING PRESENCE OF INKS THAT ARE INVISIBLE TO SENSING DEVICES (Nelson et al., assigned to the common assignee of the present invention and incorporated herein by reference), a system and method for determining the presence of inks that are visible to the normal human eye, but optically "invisible" to sensors is provided.

There remains a need for a method and apparatus for aligning an ink-jet print cartridge which prints a clear fluid on the print medium

SUMMARY OF THE INVENTION

In its basic aspects, the present invention provides a method for determining positional correction factors for at least one ink-jet clear fluid writing instrument and at least one ink-jet colorant writing instrument respectively mounted for printing on an adjacently positioned print medium and using a predetermined pattern of printing. The process includes the steps of: mounting the ink-jet clear fluid writing instrument and ink-jet colorant writing instrument in predetermined fixed positions relative to each other for printing pixels on the adjacently positioned print medium; mounting an optical sensing device in a predetermined fixed position relative to the ink-jet clear fluid writing instrument and ink-jet colorant writing instrument; printing a first predetermined pattern in predetermined target regions on a blank print medium by firing from one writing instrument; printing a second predetermined pattern on the print medium by firing from the other writing instrument such that first regions of print occur superjacent the first predetermined pattern and second regions of print occur substantially adjacent the first regions such that the first regions wherein the first and second regions have differences in reflectivity recognizable by the optical sensing device; sensing the first regions and the second regions with the optical sensing device to obtain data representative of the differences in reflectivity; and determining positional difference between the first regions and the second regions compared to predetermined target regions positions of the first predetermined pattern.

In another basic aspect, the present invention provides a test pattern for aligning a clear fixer printhead of a first ink-jet pen firing drops of a clear fixer to a printhead of a second ink-jet pen firing drops of colorant, including: at least one series of positional-calibration indicia of clear fixer formed on a print medium by the first ink-jet pen; and at least one colorant deposited on the series of positional-calibration indicia of clear fixer and on regions of the print medium adjacent to the indicia, wherein the indicia having colorant deposited thereon and the regions of the print medium adjacent to the indicia have different coefficients of reflectivity.

In another basic aspect the present invention provides an apparatus for aligning a clear fixer printhead of a first ink-jet pen firing drops of a clear fixer to printheads of at least one ink-jet pen 115 firing drops of color ink, including: optical sensor devices for projecting light and receiving light to which the clear fixer is optically unrecognizable when deposited on blank print media, wherein the color ink has a reflectivity that is optically recognizable when compared to the blank print media; mechanisms for exposing the print media to the optical sensor while the sensor is operated; a first printhead for printing a predetermined fractional fill pattern on a first region with the first ink-jet pen firing drops of the clear fixer; a second printhead for printing on the print media with color ink from the at least one ink-jet pen firing drops of color ink both superjacent onto the fractional fill pattern and region adjacent the fractional fill pattern on the blank print media such that bleed of the clear fixer with the superjacent color ink converts the fractional fill pattern into a fill pattern that has a different reflectivity than the regions adjacent the fractional fill pattern; and mechanisms for comparing data representative of the predetermined fractional fill pattern to the actual position of the first region.

In another basic aspect the present invention provides an ink-jet pen hard copy apparatus for depositing droplets of marking fluid on targeted pixels of a print media, including: a first printing mechanism for printing a clear fluid on a print medium in a print zone of the apparatus; a second printing mechanism for printing ink on the print medium in the print zone of the apparatus; a determining mechanism for determining presence of print on the print medium, including an optical sensing means for directing light onto the print medium and detecting reflections of the light from the print medium wherein the determining means senses reflectivity differences between ink on the print medium and ink overlaid on the clear fluid on the print medium; and a positioning mechanism for locating particular regions of patterns printed by the first printing means and second printing means, the patterns having both regions of ink on the print medium and regions of ink overlaid on the clear fluid on the print medium.

It is an advantage of the present invention that it provides a method and apparatus for optically determining deposits of clear fluid without resorting to ultraviolet, infrared, flourescent, or the like specialized mechanisms for sensing.

It is an advantage of the present invention that it provides a solution that does not require additional components to be incorporated into an ink-jet hard copy apparatus.

It is another advantage of the present invention that by using existing product devices, manufacturing costs are not increased.

It is another advantage of the present invention that by using existing product devices it reduces the potential of added complexity and attendant lowering of reliability.

It is another advantage of the present invention that it permits the manufacture of products having a minimized size.

It is another advantage of the present invention that it provides a product adaptable to a plurality of functional designs.

Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
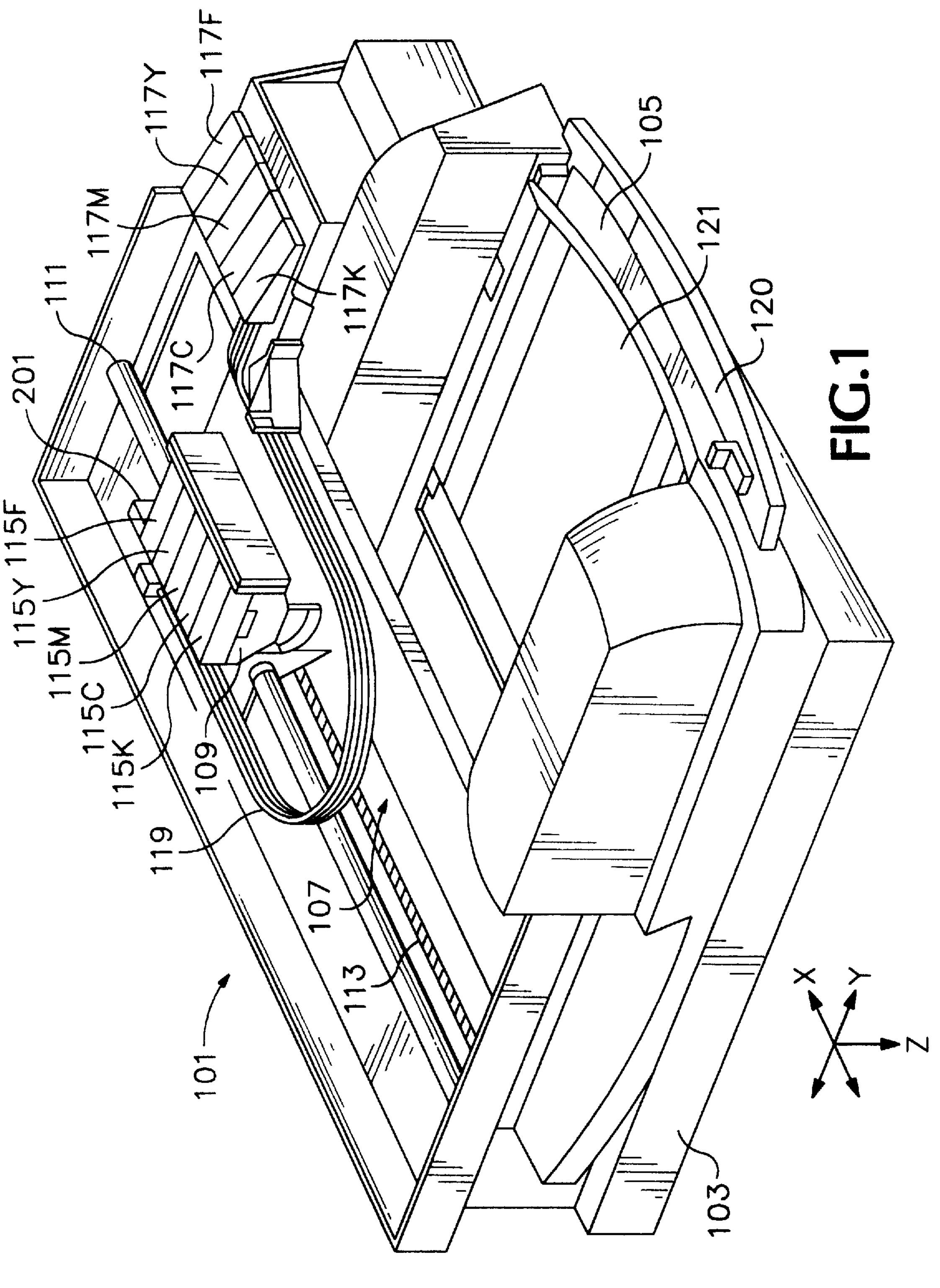
FIG. 1 is a perspective view of an ink-jet printer in accordance with the present invention.

FIG. 1 depicts an ink-jet hard copy apparatus, in this exemplary embodiment, a computer peripheral, color printer, 101. A housing 103 encloses the electrical and mechanical operating mechanisms of the printer 101. Operation is administrated by an internal electronic controller (usually a microprocessor or application specific integrated circuit ("ASIC") controlled printed circuit board) connected by appropriate cabling (not shown) to the computer. It is well known to program and execute imaging, printing, print media handling, control functions, and logic with firmware or software instructions for conventional or general purpose microprocessors or ASIC's. Cut-sheet print media 105—referred to generically hereinafter simply as "paper," regardless of actual medium selected by the end-user—is loaded by the end-user onto an input tray 120. Sheets of paper are then sequentially fed by a suitable, internal, paper-path transport mechanism (not shown) to an internal printing station platen, or "print zone," 107 where graphical images or alphanumeric text are created using state of the art color imaging and text rendering using dot matrix manipulation techniques. A carriage 109, mounted on a slider 111, scans the paper sheet delivered to the print zone 107. An encoder strip 113 and appurtenant position encoding devices on the carriage 109 and as part of the controller are provided for keeping track of the position of the carriage 109 at any given time (see e.g., a SINGLE CHANNEL ENCODER SYSTEM and a SINGLE CHANNEL ENCODER WITH SPECIFIC SCALE SUPPORT STRUCTURE are described by Majette et al. in U.S. Pat. Nos. 4,789,874 and 4,786,803, respectively (assigned to the common assignee of the present invention and incorporated herein by reference). A set of individual ink-jet writing instruments, "pens," 115K, 115C, 115M, 115Y, 115F, each having ink-jet printheads as would be known in the art (not seen in this perspective), are releasably mounted in fixed positions on the carriage 109 for easy access and repair or replacement. Each printhead mechanisms is adapted "jetting" minute droplets of ink or other fluids (see e.g., Allen, supra) to form dots on adjacently positioned paper in the print zone 107. Refillable or replaceable ink supply cartridges, or "reservoirs," 117K, 117C, 117M, 117Y are provided; generally, in a full color ink-jet system, inks for the subtractive primary colors, cyan, yellow, magenta (CYM) and a true black (K) ink are used; note however that additive primary colors—red, blue, green—or other colorants can be used). In this set, a pen 115F and cartridge 117F for a clear fluid fixer "F," is also provided. The pens 115 are coupled to respective cartridges by flexible tubing 119. Note also that the present invention can be implemented in hard copy apparatus employing self-contained supply, replaceable, ink-jet cartridges as are known in the art. Once a printed page is completed, the sheet of paper is ejected onto an output tray 121. It is common in the art to refer to the pen scanning direction as the x-axis, the paper feed direction as the y-axis, and the ink drop firing direction as the z-axis.

Figure 2:
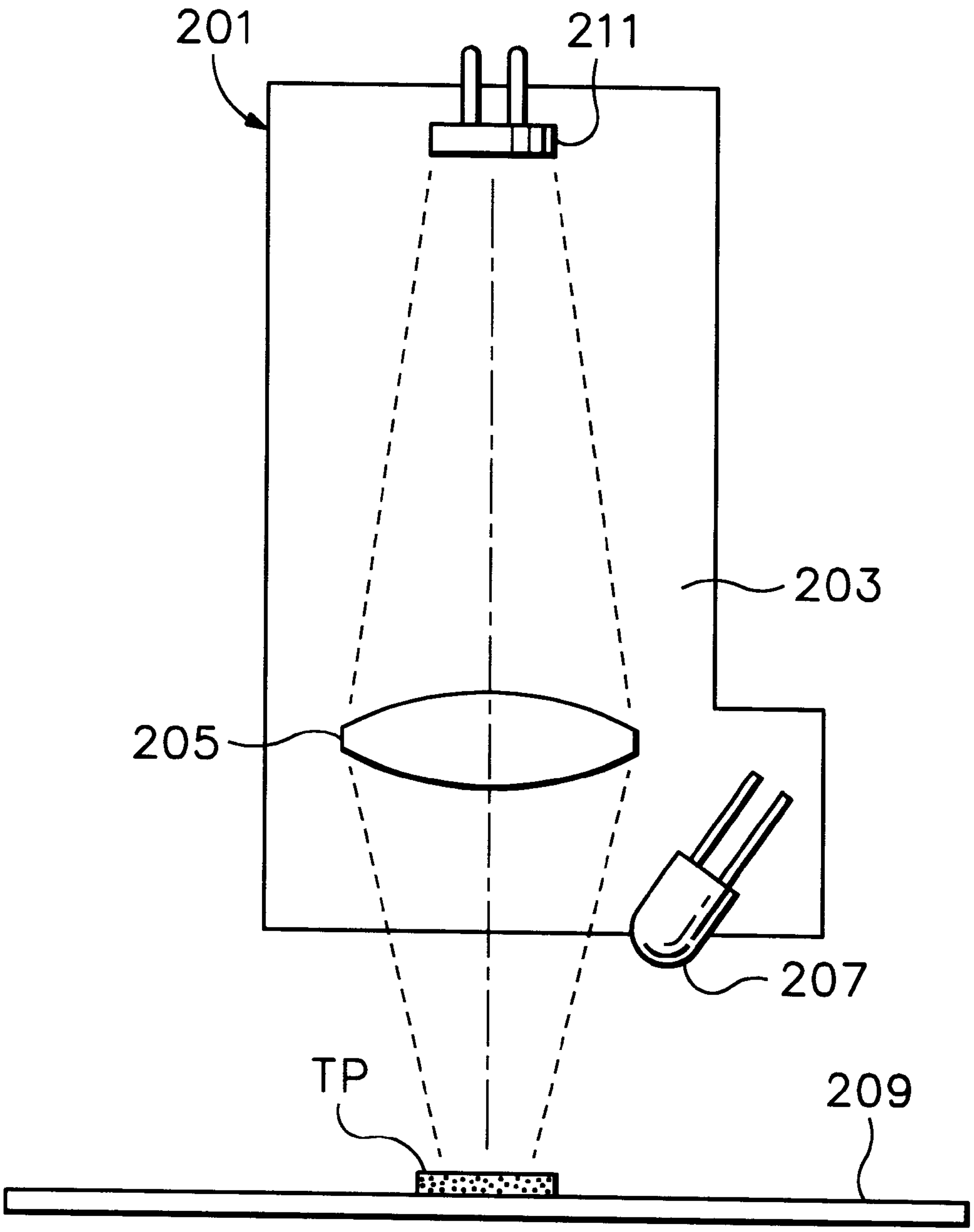
FIG. 2 is an optical sensing unit used in accordance with the present invention as shown in FIG. 1.

FIG. 2 is a schematic depiction of an optical sensor unit used in accordance with the present invention. Ink-jet nozzles of the printheads are generally in-line with the sensor module 201 in the x-axis by mounting the module 201 appropriately on the carriage 109 (FIG. 1). The sensor module 201 optically senses visible pen markings on the paper—namely ink dots or sets of ink dots—and provides electrical signals to the controller and the alignment algorithm, indicative of the registration of the portions of the printed pattern produced. An optical component holder 203 contains a lens 205. In the exemplary embodiment shown, one or more light-emitting diodes ("LEDs") 207 are mounted at an angle to the plane of the print zone 107 (FIG. 1). As will be recognized by a person skilled in the art, it is also known in the art to use refraction and diffusion devices to align the light emitting and light sensitive components.

The LEDs 207 project light onto a test pattern "TP" printed with the printheads on the paper 209, and the light is then reflected to a photodetector 211. Known manner optical sensing and signal process techniques are applied wherein the actual sensed pattern can be compared to the test pattern expected (see e.g., Cobbs et al., supra). For further details regarding a specific, multifunction, optical sensor module useful in accordance with the present invention, reference can be made to U.S. patent application Ser. No. 09/183,086 (filed Oct. 28, 1998 by WALKER et al. (assigned to the common assignee of the present invention and incorporated herein by reference).

Figure 3:
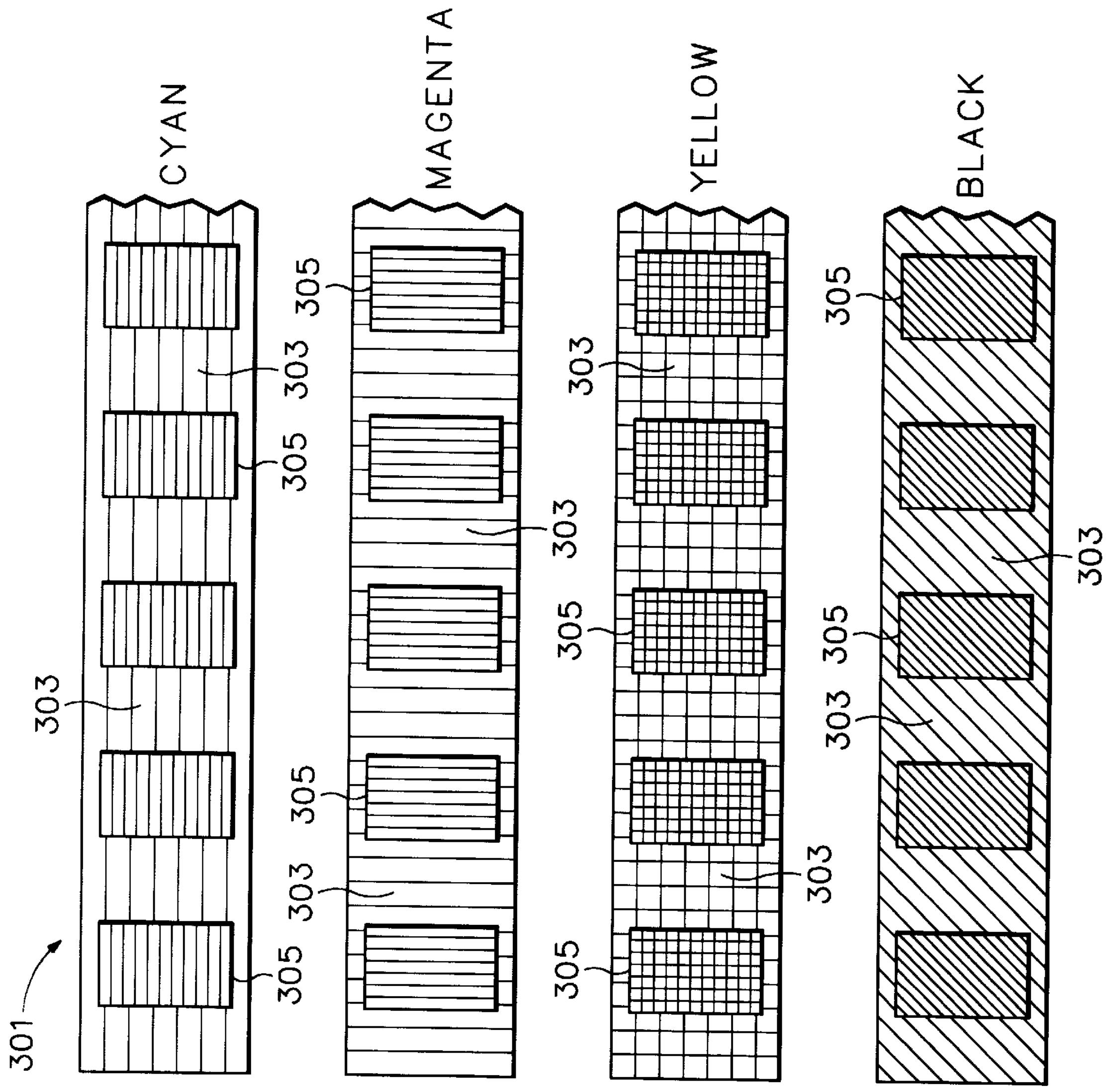
FIG. 3 is a test pattern for scanning with the optical sensing unit as shown in FIG. 2 and as used in accordance with the present invention as shown in FIG. 1.

FIG. 3 is a schematic representation of an exemplary embodiment test pattern in accordance with the present invention used for alignment of the clear fluid printhead to the other ink pen 115 printheads. An actual test pattern would be in color and is represented by the labeled shadings in this black and white exemplary rendition.

A predetermined pattern 301 of bars 305, or other geometric shapes suitable to the particular implementation, is laid down on the paper using only clear fixer. The bars 305 in the known test pattern 301 are in effect a series of positional-calibration indicia; that is, from the data base comprising the pattern and the position of the carriage 109 as determined by the encoder 113, the bars printed from the pattern data relate the printhead position of the clear fixer pen 115F at the time of firing toward a specific target picture element ("pixel") on the paper. The particular pattern implemented for a specific embodiment or purpose only need consist of a fractional fill pattern created on the blank paper.

Then, the clear fixer test pattern of bars 305 and regions 303 between the bars are overlaid with ink from one or more of the pens. The next swath height (equal to printhead height) of pattern of fixer bars 305 is printed. The process continues for all inks or combinations of ink that are of interest. It should be noted that there may be particular chemistry embodiments where fixer is deposited after the colorant.

The result is a test pattern wherein the color inks will diffuse into the paper in regions 303 where there is no fixer, namely, between the geometric bars 305. This results in less vivid color regions 303 between the fixer bars 305. It has been found that the reflectivity of overlaid fixer bars 305 is a recognizable difference from the diffuse regions 303 where no fixer was laid down before overprinting with a colorant.

Other colors can be made by mixing inks during a scan. Depending on the wavelength of the LED 207, particular colors to which the LED will be more sensitive can be used.

The generated data—namely, the actual position of the bars 305 of pixels having fixer thereon derived from the encoder 113 data and sensor 201 data—is compared to the expected position based on the given test pattern data. The alignment algorithm determines particular nozzle firing misalignments and the results are used by the printer's printing algorithm for operation printing jobs. Corrections for deviations in the carriage-scan x-axis and the paper scan y-axis can be calculated. For example, the Cobbs et al., supra, algorithm works for offsets between pens, along the paper advance y-axis can be corrected by selecting certain printhead nozzles for activation. Another correction could be applied by masking the data as being between swaths of the marking implements as taught by Sievert et al., supra.

The present invention provides a test pattern where enhance contrast of regions having fixer are overlaid with sensor visible ink because the aggregations of fixer and colorant are broken up rather than being continuous across an entire test image.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A method for determining positional correction factors for at least one ink-jet clear fluid writing instrument and at least one ink-jet colorant writing instrument respectively mounted for printing on an adjacently positioned print medium and using a predetermined pattern of printing, the method comprising:

mounting the ink-jet clear fluid writing instrument and ink-jet colorant writing instrument in predetermined fixed positions relative to each other for printing pixels on the adjacently positioned print medium;

mounting an optical sensing device in a predetermined fixed position relative to the ink-jet clear fluid writing instrument and ink-jet colorant writing instrument;

printing a first predetermined pattern in predetermined target regions on a blank print medium by firing from one writing instrument;

printing a second predetermined pattern on the print medium by firing from the other writing instrument such that first regions of print occur superjacent the first predetermined pattern and second regions of print occur substantially adjacent the first regions such that the first regions wherein the first and second regions have differences in reflectivity recognizable by the optical sensing device;

sensing the first regions and the second regions with the optical sensing device to obtain data representative of the differences in reflectivity;

determining positional difference between the first regions and the second regions compared to predetermined target regions positions of the first predetermined pattern; and scanning the ink-jet clear fluid writing instrument across the print medium and firing clear fluid droplets toward predetermined target pixels to form a pattern of a series of positional-calibration indicia.

2. The method as set forth in claim 1 wherein printing a first predetermined pattern in predetermined target regions on a blank print medium by firing from one writing instrument further comprises:

depositing clear fluid droplets from the ink-jet clear fluid writing instrument.

3. The method as set forth in claim 2, wherein printing a second predetermined pattern on the print medium by firing from the other writing instrument such that first regions of print occur superjacent the first predetermined pattern and second regions of print occur substantially adjacent the first regions such that the first regions and the second regions have differences in reflectivity recognizable by the optical sensing device further comprises:

depositing droplets from the ink-jet colorant writing instrument.

4. The method as set forth in claim 1, the printing a first predetermined pattern further comprising:

forming one series of positional-calibration indicia for each ink-jet colorant writing instrument.

5. The method as set forth in claim 5, the printing a second predetermined pattern comprising:

printing a respective band of colorant over and between each respective series of positional-calibration indicia from each the respective ink-jet colorant writing instrument.

6. A test pattern for aligning a clear fixer printhead of a first ink-jet pen firing drops of a clear fixer to a printhead of a second ink-jet pen firing drops of colorant, comprising:

at least one series of positional-calibration indicia of clear fixer formed on a print medium by the first ink-jet pen; and at least one colorant deposited on the series of positional-calibration indicia of clear fixer and on regions of the print medium adjacent to the indicia, wherein the indicia having colorant deposited thereon and the regions of the print medium adjacent to the indicia have different coefficients of reflectivity, wherein the positional-calibration indicia provide data obtained with respect to corrections for deviations in a x-axis and a y-axis.

7. An apparatus for aligning a clear fixer printhead of a first ink-jet pen firing drops of a clear fixer to printheads of at least one ink-jet pen firing drops of color ink, comprising:

optical sensor means for projecting light and receiving light to which the clear fixer is optically unrecognizable when deposited on blank print media, wherein the color ink has a reflectivity that is optically recognizable when compared to the blank print media;

means for exposing the print media to the optical sensor while the sensor is operated;

first printhead means for printing a predetermined fractional fill pattern on a first region with the first ink-jet pen firing drops of the clear fixer;

second printhead means for printing on the print media with color ink from the at least one ink-jet pen firing drops of color ink both superjacent onto the fractional fill pattern and region adjacent the fractional fill pattern on the blank print media such that bleed of the clear fixer with the superjacent color ink converts the fractional fill pattern into a fill pattern that has a different reflectivity than the regions adjacent the fractional fill pattern; and means for comparing data representative of the predetermined fractional fill pattern to the actual position of the first region, wherein the means for exposing the print media includes a mounting wherein the first ink-jet pen and the at least one ink-jet pen firing drops of color ink are fixedly mounted and the sensing means are fixedly aligned in a Predetermined relationship to each other.

8. The apparatus as set forth in claim 7, comprising:

the mounting is a scanning carriage for carrying the first ink-jet pen and the at least one ink-jet pen firing drops of color ink across predetermined swath positions of the print medium.

9. The apparatus as set forth in claim 7, the means for comparing data representative of the predetermined fractional fill pattern to the actual position of the first region comprising:

means for relating data obtained by the sensor with respect to corrections for deviations in a carriage-scan x-axis and a paper scan y-axis.

10. An ink-jet pen hard copy apparatus for depositing droplets of marking fluid on targeted pixels of a print media, comprising:

first printing means for printing a clear fluid on a print medium in a print zone of the apparatus;

second printing means for printing ink on the print medium in the print zone of the apparatus;

determining means for determining presence of print on the print medium, including an optical sensing means for directing light onto the print medium and detecting reflections of the light from the print medium wherein the determining means senses reflectivity differences between ink on the print medium and ink overlaid on the clear fluid on the print medium; and positioning means for locating particular regions of patterns printed by the first printing means and second printing means, the patterns having both regions of ink on the print medium and regions of ink overlaid on the clear fluid on the print medium, wherein the clear fluid is an ink fixer, the first printing means is an ink-jet fixer printhead for firing droplets of fixer onto targeted pixels of the print medium, and the second printing means is a plurality of ink-jet inking printheads, each firing droplets of a different colorant onto targeted pixels of the print medium, wherein the fixer printhead and the inking printheads are fixedly mounted with respect to each other in predetermined positions in a printhead scanning carriage associated with a positional encoder.

11. The apparatus as set forth in claim 10, comprising:

the optical sensing means includes an light emitting diode for emitting a predetermined wavelength light selected for determining reflectivity each different colorant;

the determining means includes a fixed mounting for the optical sensing means wherein the optical sensing means is fixedly mounted with respect to the fixer printhead and the inking printheads in a predetermined position in the printhead scanning carriage associated with the positional encoder.

12. The apparatus as set forth in claim 10, the patterns further comprising:

at least one series of positional-calibration indicia of clear fixer formed on a print medium by the first ink-jet pen; and at least one colorant deposited on the series of positional-calibration indicia of clear fixer and on regions of the print medium adjacent to the indicia, wherein the indicia having colorant deposited thereon and the regions of the print medium adjacent to the indicia have different coefficients of reflectivity.

13. The apparatus as set forth in claim 12, comprising:

the positional-calibration indicia provide data obtained with respect to corrections for deviations in a carriage-scan x-axis and a paper scan y-axis.

14. An ink-jet pen hard copy apparatus for depositing droplets of marking fluid on targeted pixels of a print media, comprising:

first printing means for printing a clear fluid on a print medium in a print zone of the apparatus;

second printing means for printing ink on the print medium in the print zone of the apparatus;

determining means for determining presence of print on the print medium, including an optical sensing means for directing light onto the print medium and detecting reflections of the light from the print medium wherein the determining means senses reflectivity differences between ink on the print medium and ink overlaid on the clear fluid on the print medium; and positioning means for locating particular regions of patterns printed by the first printing means and second printing means, the patterns having both regions of ink on the print medium and regions of ink overlaid on the clear fluid on the print medium, wherein at least one series of positional-calibration indicia of clear fixer formed on a print medium by the first ink-jet pen, and at least one colorant deposited on the series of positional-calibration indicia of clear fixer and on regions of the print medium adjacent to the indicia, wherein the indicia having colorant deposited thereon and the regions of the print medium adjacent to the indicia have different coefficients of reflectivity.

15. The apparatus as set forth in claim 14, comprising:

the positional-calibration indicia provide data obtained with respect to corrections for deviations in a carriage-scan x-axis and a paper scan y-axis.

* * * * *